United States Patent [19]

Solum

[11] 4,216,094
[45] Aug. 5, 1980

[54] SECTOR BODY FOR ROTARY DISC DEWATERING APPARATUS

[75] Inventor: Dallas H. Solum, Salt Lake City, Utah

[73] Assignee: Envirotech Corporation, Menlo Park, Calif.

[21] Appl. No.: 22,236

[22] Filed: Mar. 20, 1979

[51] Int. Cl.² .................................................. B01D 39/00
[52] U.S. Cl. ......................................... 210/331; 210/486
[58] Field of Search ................ 210/232, 331, 345, 347, 210/461, 486, 498

[56] References Cited

U.S. PATENT DOCUMENTS

| 1,767,078 | 6/1930 | Johnson | 210/331 |
|---|---|---|---|
| 2,104,473 | 1/1938 | Watson | 210/331 |
| 2,781,133 | 2/1957 | Thompson | 210/331 |
| 3,291,164 | 12/1966 | Swallow | 210/331 |
| 3,339,742 | 9/1967 | Kracklaver | 210/232 |
| 3,485,376 | 12/1969 | Peterson et al. | 210/331 |
| 3,643,803 | 2/1972 | Glos | 210/232 |
| 3,971,722 | 7/1976 | Radford | 210/486 |

Primary Examiner—Frank Sever
Attorney, Agent, or Firm—John J. Morrissey

[57] ABSTRACT

A sector body for use in a rotary disc dewatering apparatus is provided with a radially extending groove on each of its opposing faces. Any slackness in a filter medium fabric covering the sector body is gathered into the radial grooves. A caulking compound is applied over the filter medium in the radial grooves to maintain tautness of the filter medium.

12 Claims, 3 Drawing Figures

SECTOR BODY FOR ROTARY DISC DEWATERING APPARATUS

BACKGROUND OF THE INVENTION

1. Field Of The Invention

This invention relates generally to apparatus for dewatering slurries in mining and metallurgical operations.

In particular, this invention pertains to a sector body for use in a rotary disc vacuum filter.

2. State of the Prior Art

Rotary disc vacuum filters are well-known in the mining and metallurgical arts for dewatering slurries. A rotary disc vacuum filter typically comprises a plurality of filter discs mounted parallel to each other along and perpendicular to the axis of an elongate center barrel for rotation about the axis. A filter disc typically comprises a plurality of wedge-shaped sector assemblies, each assembly comprising a sector body and a bell member. The sector body is covered by a filter medium made of a flexible material such as a woven cloth or a wire screen.

During a first portion of a rotation of the center barrel, each sector assembly is immersed in the slurry to be filtered. When the sector assembly is immersed in the slurry, suction is applied to draw liquid from the slurry through the filter medium and thence via the sector body to the bell member. From the bell member, this filtrate liquid passes into the center barrel for removal to a storage or discharge means. Particulate matter in the slurry cannot pass through the filter medium, and hence forms a cake on the exterior surface of the filter medium. During a subsequent portion of the same rotation of the center barrel, the sector assembly is lifted out of the slurry. When the sector assembly is out of the slurry, positive air pressure is applied either continuously or in bursts via the sector body to shake the filter medium in order to dislodge the cake of particulate matter that has formed thereon.

In one type of sector assembly known to the prior art, the sector body comprises a perforated hollow structure. When the sector assembly is immersed in the slurry, a vacuum is provided in the interior of the hollow sector body whereby liquid can be sucked through the filter medium into the interior of the sector body for passage therethrough to the interior of the bell member and thence to the center barrel. When the sector body is rotated out of the slurry, pressurized air is blown either as a continuous or in bursts through the perforations in the sector body to shake or snap the covering filter medium.

In another type of sector assembly known to the prior art, the sector body is a solid body provided with a pattern of drainage channels on its surfaces. The lands between these channels support the filter medium away from the interior of the channels. When the sector assembly of this type is immersed in the slurry, a vacuum is provided in these drainage channels to draw liquid through the filter medium and thence along the drainage channels into the bell member for passage to the center barrel. When the sector assembly is rotated out of the slurry, a source of positive air pressure is applied along the channels to blow against the filter medium, thereby shaking or snapping the filter medium in order to remove filter cake therefrom.

The sector body of the second type of sector assembly described above, i.e., a sector body having surface drainage channels, may be perforated hollow structure instead of a solid body. Where surface drainage channels are provided on a perforated hollow sector body structure, suction and positive air pressure can be applied via the interior of the sector body through the perforations on the sector body. A major portion of the flow of filtrate liquid through the filter medium passes to the bell member along the surface drainage channels, although a certain amount of filtrate liquid also enters the interior of the sector body through the perforations.

In any of the types of sector assemblies described above, the sector body covered with the filter medium is coupled to the bell member in such a way as to enable filtrate liquid to flow either along drainage channels on the surface of the sector body or through the interior of the sector body into the bell member. The filtrate liquid passes through the bell member into the center barrel. The filtrate liquid passed into the center barrel from all the discs of the dewatering apparatus is typically removed from the center barrel by vacuum and passed to an appropriate means for further treatment and/or discharge or reuse.

A detailed description of a particular type of rotary disc dewatering apparatus now known to the prior art is provided in co-pending U.S. patent application Ser. No. 804,829, which is assigned to Envirotech Corporation.

Materials such as woven cloth and metal screens have been used in the prior art as filter media. Such fabrics periodically wear out and have to be replaced. Repeated flexing of a filter medium, particularly flexing due to the shaking and/or snapping of the filter medium to dislodge the filter cake therefrom, is a major cause of wear.

SUMMARY OF THE INVENTION

The present invention recognizes that creases and wrinkles are likely to occur in filter media used to cover sector bodies of the kind known in the prior art. These creases and wrinkles occur primarily as a result of the repeated flexing of a filter medium during the cyclic application of suction and positive air pressure in the dewatering process. The present invention further recognizes that rips and tears in the filter medium usually begin along such wrinkles or creases.

It is therefore an object of the present invention to provide a sector assembly for use in a rotary disc vacuum filter in which the likelihood of a crease or wrinkle developing in the filter medium covering the sector body of the assembly is minimized.

It is concomitantly an object of the present invention to provide a sector assembly for use in a rotary disc vacuum filter in which slackness in the filter medium covering the sector body of the assembly is substantially eliminated.

It is also an object of the present invention to provide such a sector assembly in which billowing of the filter medium during the cyclic application of suction and positive air pressure is minimized.

Another object of the present invention is to provide a sector assembly in which tautness of the filter medium covering the sector body can be maintained as long as possible during operation of the rotary disc vacuum filter in which the sector assembly is installed.

A related object of the present invention is to provide a sector assembly in which the longevity of the filter medium covering the sector body can be maximized.

It is a particular object of the present invention to provide a sector assembly for use in a rotary disc vacuum filter, the sector assembly comprising a filter medium covering the wedge-shaped sector body, where the sector body is configured to enable the filter medium to be maintained tautly around the sector body.

It is a further object of the present invention to provide a method whereby a filter medium can be maintained tautly over a sector body without the use of staples or tacks for attaching the filter medium to the sector body, whereby tears in the filter medium that might be caused by staples or tacks can be prevented.

The objects of the present invntion are accomplished by providing a radially extending groove on the exterior surface of the sector body, and by using a caulking material to retain in the groove that portion of the filter medium that overlies the groove. Preferably, a radially extending groove according to the present invention is provided on each of the oppositely facing wide surfaces of the sector body. The filter medium may be formed as a bag or sack that fits over the sector body, in which case slackness in the bag or sack is eliminated by pressing those portions of the bag or sack overlying the radial grooves into the grooves by means of a caulking compound. Alternatively, the filter medium may be wrapped around the sector body so that one end of the filter medium overlaps another end of the filter medium in the region over the radial groove on one face of the sector body. Caulking is used to retain the overlapping ends of the filter medium within the groove, and caulking is also used to gather and retain a portion of the filter medium in the groove on the obverse face of the sector body. In this way, slackness in the filter medium is prevented and the opportunity for the formation of wrinkles and/or creases is minimized.

In the embodiment of the present invention as described hereinafter, a single radially extending groove (called a caulking groove) is provided on each face of the sector body. However, for particular applications, especially for sector bodies of very large surface area, a plurality of such caulking grooves on each face of the sector body may be provided.

Tautness in a filter medium covering a sector body according to the present invention can be maintained throughout the operational lifetime of the filter medium by re-caulking, or by applying additional caulking material, as appropriate, to retain the filter medium in the caulking groove or grooves.

Particular features of the present invention will become apparent to workers skilled in the rotary disc dewatering art upon a perusal of the following specification in conjunction with the accompanying drawing.

DESCRIPTION OF PREFERRED EMBODIMENT

Figure 1:
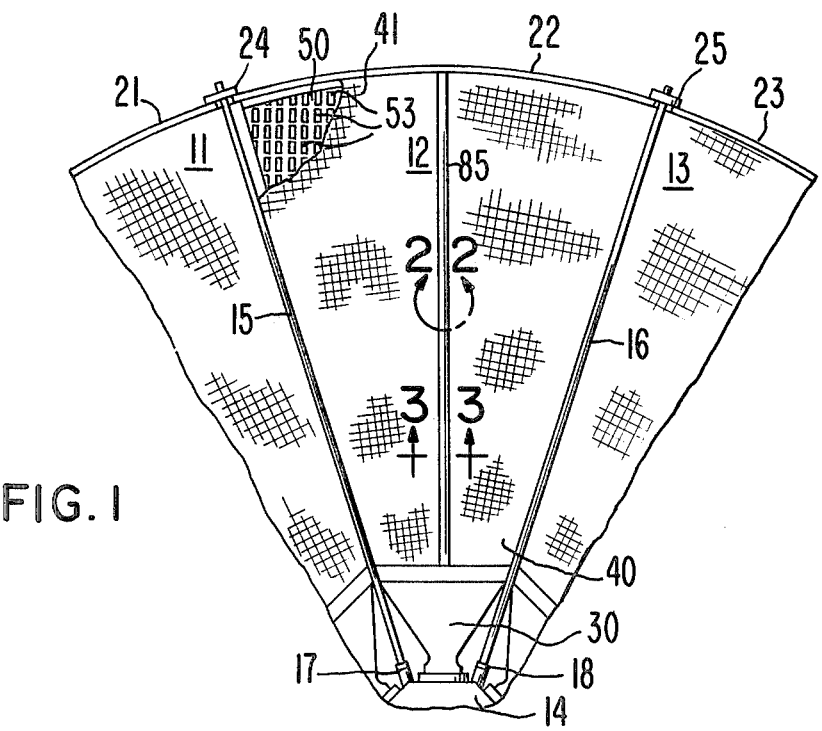
FIG. 1 provides a plan view of a sector assembly for a rotary disc dewatering appparatus according to the present invention.

In FIG. 1, a portion of a filter disc 10 of a rotary disc dewatering apparatus is shown in plan view. The disc 10 comprises a plurality of wedge-shaped sector assemblies, of which only the sector assembly 12 and portions of the sector assemblies 11 and 13 adjacent on either side, respectively, of the assembly 12 are shown. The sector assemblies of the disc 10 are mounted in alignment with each other in a plane perpendicular to the axis of an elongate central conduit structure 14, which is denominated in the art as a center barrel.

The sector assemblies of the disc 10 are preferably fabricated as fungible stock items so that any one sector assembly can be replaced as necessary by any other sector assembly of the same kind. Thus, sector assembly 12 is substantially identical to all the other sector assemblies comprising the disc 10. The present invention can therefore be described with particular reference to the sector assembly 12.

The sector assembly 12, like every other sector assembly of the disc 10, is secured to the rotatable center barrel 14 by means well-known in the art. As shown in FIG. 1, radially extending rods 15 and 16 are positioned on either side of the sector assembly 12. The proximal ends of the rods 15 and 16 are secured to the center barrel 14 by conventional means such as by threading into sockets 17 and 18, respectively, provided for that purpose. The rod 15 extends radially outward from the center barrel 14 in the space between the adjacent sector assemblies 11 and 12, and the rod 16 extends radially outward in the space between the sector assemblies 12 and 13. An arcuate frame member 21 is disposed adjacent the peripheral outer edge of the wedge-shaped sector assembly 11, and similar arcuate frame members 22 and 23 are disposed adjacent the peripheral outer edges of the sector assemblies 12 and 13, respectively. An apertured retaining member 24 fits over the distal end of the rod 15 and overlaps adjacent ends of the arcuate frame members 21 and 22. The retaining member 24 might itself be threadably received on the distal end of the rod 15, or it might be held in place on the distal end of the rod 15 by a nut or other securing means. Similarly, an apertured retaining member 25 overlaps adjacent ends of the arcuate frame members 22 and 23 and fits over the distal end of the rod 16.

Similar frame members and retaining members are located around the periphery of the disc 10 whereby a plurality of sector assemblies can be securely attached to the center barrel 14.

The sector assembly 12, which is representative of all other sector assemblies of the disc 10, comprises a bell member 30 and a sector body 40. The bell member 30 is a metallic conduit structure that is characterized variously as wedge-shaped, keystone-shaped or bell-shaped, and provides for liquid and gas communication between the sector body 40 and the center barrel 14. The bell member 30 may be secured to the center barrel 14 by a threaded connection or by a bolted flange connection according to techniques well known in the art. The sector body 40 is covered by a filter medium 41, which is made of a porous flexible fabric such as a woven cloth or a metallic screen. The sector body 40 with its covering filter medium 41 is coupled to the bell member 30 by any appropriate technique known in the art so as to permit fluid flow between the sector body 40 and the center barrel 14 via the bell member 30.

During a portion of each complete rotation of the center barrel 14, the sector assembly 12 is immersed in a slurry that is to be filtered. During another portion of the same rotation, the sector assembly 12 is lifted out of the slurry. When the sector assembly 12 is immersed in the slurry, suction is provided to draw liquid from the slurry through the filter medium 41 and thence via the sector body 40 into the bell member 30 for passage to the center barrel 14. Particulate matter in the slurry cannot pass through the filter medium 41, and hence forms a cake on the exterior surface of the filter medium 41. When the sector assembly 12 is rotated out of the slurry, positive air pressure is applied either continuously or in bursts via the sector body 40 to shake and/or snap the filter medium 41 in order to dislodge particulate matter that has caked thereon.

In the embodiment shown in FIG. 1, the sector body 40 is a hollow structure having perforations on the surfaces thereof. As shown in cross-sectional view in FIG. 3, the sector body 40 of this embodiment comprises two panels 50 and 60 disposed obversely with respect to each other and spaced apart by a spacing member 70 to define an interior region therebetween. The panels 50 and 60 of the sector body 40 are substantially identical to each other, and hence both can be described with reference to the panel 50 seen in FIG. 1.

In operation, when the sector assembly 12 of FIG. 1 is immersed in the slurry, a partial vacuum is provided in the interior region of the sector body 40 by means well-known in the art. This vacuum causes so-called filtrate liquid to be drawn from the slurry through the filter medium 41 and through the surface perforations on the sector body 40 into the interior region between the panels 50 and 60. This filtrate liquid then passes from the interior region of the sector body 40 into the bell member 30 for passage into the center barrel 14.

In an alternative embodiment, the sector body 40 comprises a single solid panel having a pattern of drainage channels on each of the opposite faces thereof. The filter medium 41 in this alternative embodiment is spaced apart from the interior of the drainage channels by the lands between adjacent channels. When the sector assembly 12 is immersed in the slurry, a partial vacuum is maintained in these channels on the sector body 40 underlying the covering filter medium 41. This vacuum causes filtrate liquid to pass through the filter medium 41 to the channels, and thence along the channels to the interior of the bell member 30 for passage to the center barrel 14.

In yet another embodiment, the sector body 40 is a perforated hollow structure having a pattern of drainage channels on its exterior faces. A greater suction can generally be provided through perforations in a rigid hollow sector body than along channels underlying a flexible porous filter medium. Thus, this other embodiment would provide the advantages of surface drainage with the high suction capability of a hollow sector body.

The sector body 40 according to the present invention, whether it is a perforated hollow structure providing drainage of the filtrate liquid through its interior or a solid panel providing surface drainage of the filtrate liquid along surface channels on its exterior, is distinguished from sector bodies of the prior art in having a radially extending groove 75 (called a caulking groove) on at least one of its opposing faces.

Figure 2:
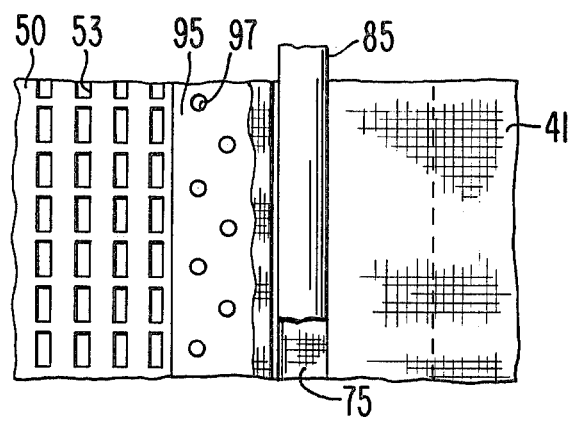
FIG. 2 is a fragmentary view of a portion of the sector body shown within line 2—2 of FIG. 1.
Figure 3:
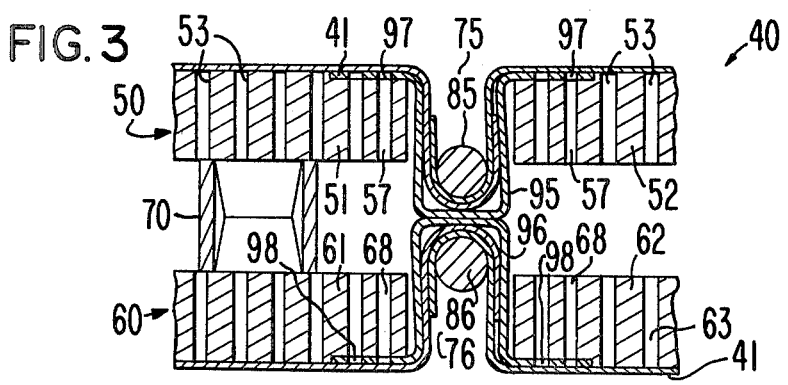
FIG. 3 is an exploded cross-sectional view along line 3—3 of FIG. 1.

The filter medium 41 could advantageously be fabricated as a sack or bag having the general configuration of the sector body 40. The sack or bag filter medium 41 would be drawn over the sector body 40, with the open end of the sack or bag being at the narrow proximal end of the sector body 40. Alternatively, the filter medium 41 could be a sheet of fabric that is wrapped around the sector body 40 so that opposite ends of the fabric overlap each other on one face of the sector body 40 in the region over the radial groove 75. In either embodiment, the portion of the filter medium 41 overlying the radial groove 75 is pressed into the groove 75 and held therein by a strip 85 of caulking compound, as shown in FIGS. 2 and 3. The caulking compound may be any one of a number of pliable and resilient materials commercially available for this purpose.

The strip 85 of caulking compound gathers and tucks the filter medium 41 into the caulking groove 75 and thereby removes slackness from the filter medium 41. Further tautness is provided in the filter medium 41 by pressing that portion of the filter medium 41 overlying a corresponding caulking groove 76 on the obverse face of the sector body 40 (i.e., on the exterior face of the panel 60 as seen in cross-sectional view in FIG. 3) into the caulking groove 76, and by retaining that portion of the filter medium 41 in the caulking groove 76 by means of a strip 86 of caulking compound.

The sector body 40 may be made of wood, metal, or a molded plastic material in accordance with conventional fabrication techniques. As shown in FIG. 3, the panels 50 and 60 comprising the sector body 40 can each be formed from separate "half panels" or panel segments 51 and 52, and 61 and 62, respectively. Perforations indicated by the reference number 53 are provided through the panel segments 51 and 52, and perforations indicated by the reference number 63 are provided through the panel segments 61 and 62, whereby filtrate liquid can flow into the interior region between the panels 50 and 60. The panel segments 51 and 52 are separated by a folded metal strip 95 that defines the caulking groove 75, and the panel segments 61 and 62 are separated by a folded metal strip 96 that defines the caulking groove 76. The edges of the panel segments 51 and 52 adjacent the folded metal strip 95 are configured to receive the edge portions of the metal strip 95 in a tight fit whereby the outer surface of these edge portions (i.e., the surface on the concave side of the folded metal strip 95 forming the caulking groove 75) is flush with the outer surfaces of the panel segments 51 and 52. Perforations indicated by the reference number 97 are provided in the edge portions of the metal strip 95 in alignment with bores 57 through the underlying edges of the panel segments 51 and 52 to provide a flow path for filtrate liquid into the interior region between the panels 50 and 60. In this way, interference by the metal strip 95 with the filtration capability of the sector body 40 is minimized.

In a similar way, the edges of the panel segments 61 and 62 adjacent the folded metal strip 96 that defines the caulking groove 76 are configured to receive the edge portions of the metal strip 96 in a tight fit whereby the outer surface of these edge portions is flush with the outer surfaces of the panel segments 61 and 62. Perforations indicated by the reference number 98 are provided in the edge portions of the metal strip 96 in alignment with bores 68 through the underlying edges of the panel segments 61 and 62 to provide a flow path for filtrate liquid into the interior region between the panels 50 and 60.

In the particular embodiment shown in FIG. 3, the folded metal strips 95 and 96 extend inwardly to meet each other. It is not essential to the purpose of eliminating slackness in the filter medium 41 that the metal strips 95 and 96 meet each other. It is only necessary that the caulking grooves 75 and 76 be deep enough to receive sufficient caulking material to accomplish this purpose. However, the configuration illustrated in FIG. 3 serves the additional purpose of providing structural rigidity for the sector body 40.

In applications where the filter disc 10 is to be immersed in a slurry comprising a specially dense particulate matter, and/or where structural rigidity of the sector body 40 is otherwise of special importance, a plurality of radially extending grooves can be provided on the exterior surfaces of each face of the sector body 40.

Where the sector body 40 is a structure having a pattern of drainage channels on its exterior surfaces, the radially extending groove 75 precludes liquid communication between the drainage channels on either side thereof. This feature causes radial flow of the filter liquid inward along the drainage channels toward the bell member 30 to predominate over lateral flow across the face of the sector body 40. Thus, the provision of the caulking groove 75 (or preferably the caulking grooves 75 and 76 on either side, respectively, of the sector body 40) according to the present invention could be expected to increase filtration efficiency by enabling a greater volume of filtrate liquid to be removed during each rotation of the sector assembly 12 than was possible with sector assemblies of the prior art.

The provision of the caulking groove 75 according to the present invention decreases the span of the filter medium 41 across the surface of the panel 50. This decrease in the lateral span of the filter medium 41 reduces the possibility of billowing thereof during the application of bursts of positive air pressure when the sector assembly 12 is rotated out of the slurry. Billowing would increase the localized tension on those portions of the filter medium 41 that are restrained from movement. Hence, reduction in the occurrence of areas of localized tension in the filter medium 41 serves to reduce the occurrence of tears in the filter medium 41, thereby extending the longevity of the filter medium 41.

By reducing the span of each portion of the filter medium 41 across the sector body 40, the provision of a caulking groove 75 according to the present invention provides a saving in energy needed for shaking or snapping the filter medium 41 during the filter cake removal process. Smaller bursts of air could be used to cause the desired reverberation of the filter medium 41 where the lateral span of the filter medium 41 is decreased than where the span of the filter medium 41 extends across the entire lateral surface of each face of the sector body 40.

The provision of a caulking groove 75 according to the present invention could be expected to provide more uniform drainage than was possible in the prior art in the case of a sector body 40 having a pattern of drainage channels on its exterior surfaces. With a face of the sector body 40 divided into non-communicating regions by the caulking groove 75, local variations from the average drainage rate across each region of the face are likely to be less than local variations from the average drainage rate across the entire face of a sector body according to the prior art. With more uniform drainage, the overlying filter medium 41 is likely to experience a more uniform drying when positive air pressure is applied. Uniformity in drying could be expected to extend the longevity of the filter medium 41.

During operation of a filter disc dewatering apparatus according to the present invention, maintenance of tautness throughout the operational lifetime of the filter medium 41 can be accomplished by re-caulking or by adding additional caulking material, as necessary, to the caulking grooves without the necessity of having to remove and re-wrap the filter medium 41.

From the above description of the preferred embodiment, other caulking groove configurations for maintaining tautness of the filter medium by gathering the filter medium fabric into one or more grooves on the face of a sector body will become apparent to workers skilled in the art. Consequently, the above description is merely illustrative of the invention, the scope of which is to be construed from the following claims and their legal equivalents.

What is claimed is:

1. An apparatus for dewatering a slurry, said apparatus comprising a filter disc mounted on an elongate center barrel for rotation about the axis of said center barrel, said disc comprising a plurality of sector assemblies, each sector assembly having side portions extending radially outward from the axis of said center barrel, each sector assembly comprising a sector body and a bell member, said sector body comprising two panels, said panels being generally parallel to and spaced apart from each other to define an interior space therebetween, at least one of said panels being perforated to enable liquid flow into said interior space, said perforated panel being covered by a filter medium, vacuum means being provided to draw liquid from said slurry through said filter medium via perforations in said perforated panel into said interior space for passage to said bell member and thence to said center barrel, a filter medium gathering means being provided on an exterior surface of at least one of said panels, said gathering means including a groove on said exterior surface, said groove extending radially with respect to the axis of said center barrel, a portion of said filter medium overlying said groove, said overlying portion of said filter medium being retained in said groove by a caulking material, said groove being located sufficiently inward from said side portions of said sector assembly so as to remove slackness from and reduce billowing of said filter medium.

2. The dewatering apparatus of claim 1 wherein said perforated panel comprises a metallic strip, said metallic strip being folded to define said groove.

3. The dewatering apparatus of claim 1 wherein both of said panels are perforated, each panel having a radially extending groove, the grooves being substantially parallel to each other.

4. The dewatering apparatus of claim 3 wherein each panel has a metallic strip, said metallic strip being folded to define the groove on said panel.

5. The dewatering apparatus of claim 4 wherein said filter medium comprises a bag fitted over said sector body.

6. The dewatering apparatus of claim 4 wherein said filter medium comprises a fabric wrapped around said sector body so that one end of said filter medium overlaps another end of said filter medium over the groove on one of said panels of said sector body.

7. The dewatering apparatus of claim 1 wherein said filter medium comprises a bag fitted over said sector body.

8. The dewatering apparatus of claim 1 wherein said filter medium comprises a fabric wrapped around said sector body so that one end of said filter medium overlaps another end of said filter medium over said groove.

9. The dewatering apparatus of claim 1 wherein said panels are spaced apart from each other by two side walls extending radially with respect to the axis of said center barrel and by a peripheral wall connecting said two side walls, said panels together with said side walls and said peripheral wall enclosing said interior space.

10. A sector body for use in a rotary filter disc dewatering apparatus, said sector body comprising two panels, said panels being generally parallel to and spaced apart from each other to define an interior space therebetween, each of said panels having side portions that extend from a narrow end to a wide end so as to provide a generally wedge-shaped configuration for said sector body, at least one of said panels being perforated to enable liquid flow into said interior space, said perforated panel being covered by a filter medium so that liquid from a slurry can be drawn through said filter medium via perforations in said perforated panel into said interior space, a filter medium gathering means being provided on an exterior surface of at least one of said perforated panels, said gathering means including a groove on said exterior surface, said groove extending radially with respect to the axis of rotation of the rotary filter disc of said dewatering apparatus, a portion of said filter medium overlying said groove, said overlying portion of said filter medium being retained in said groove by a caulking material, said groove being located sufficiently inward from said side portions so as to remove slackness from and reduce billowing of said filter medium.

11. The sector body of claim 10 wherein both of said panels are perforated, each panel having a radially extending groove, said grooves being parallel to each other.

12. The sector body of claim 11 wherein each panel comprises a metallic strip, said metallic strip being folded to define the groove on said panel.

* * * * *